2,927,105
POLYMERIZATION OF ETHYLENE

Hans Nienburg, Ludwigshafen (Rhine), Georg Schiller, Mannheim-Feudenheim, Heinz Weber, Ludwigshafen (Rhine), and Hans Boehm, Speyer, Germany, assignors to Badische Anilin- & Soda-Fabrik Aktiengesellschaft, Ludwigshafen (Rhine), Germany No Drawing. Application January 4, 1956
Serial No. 557,232

Claims priority, application Germany January 5, 1955

15 Claims. (Cl. 260—94.9)

This invention relates to the polymerization of ethylene. More specifically expressed, the invention is concerned with a polymerization process for ethylene in which titanium halides in combination with other substances are used as catalysts.

It is already known to polymerize ethylene under pressure and at elevated temperature with a mixed catalyst of aluminum chloride and titanium tetrachloride, the products being solid polymers and oily constituents. Ethylene polymers having 10 to 20 carbon atoms have also already been prepared from ethylene at atmospheric pressure and in the temperature range between 0° and 40° C. while using aluminum chloride solutions in ethyl chloride.

It is also known that ethylene can be polymerized with aluminum alkyls. Depending on the operational conditions there are thereby obtained low molecular weight homogeneous olefines, products similar to soft or hard paraffin wax, or film-forming polyethylenes. For the production of the film-forming polymers, however, it is necessary to employ fairly high pressures because this polymerization reaction proceeds only slowly at low pressures. Moreover the aluminum alkyls are extremely sensitive to oxidation and this introduces risk because such catalysts can ignite in contact with air.

The object of the present invention is a process for the polymerization of ethylene which is free from the said disadvantages. Another object of the invention is a process in which ethylene is polymerized at low pressure and with the use of a catalyst stable to oxidation for the production of high molecular weight film-forming products.

Further objects and advantages of the invention may be seen in the following more detailed description of the invention.

These objects are achieved according to the present invention by polymerizing ethylene with a mixture of a titanium halide and a metal capable of reducing tetravalent titanium ions into trivalent titanium ions, in the presence of an alkyl halide. There are thereby formed solid film-forming polyethylenes without large admixtures of low molecular weight constituents.

Surprisingly the high molecular weight film-forming polyethylenes are formed very rapidly by this process even at low pressures, so that industrially it is preferable to work at atmospheric pressure or at moderately increased pressure, but obviously it is also possible to carry out the polymerization also at higher pressures, as for example at 100 atmospheres. Favorable polymerization temperatures lie between —120° C. and +100° C., preferably between —30° and +20° C.

Among the titanium halides, titanium tetrachloride is especially suitable; this is miscible in all proportions with the alkyl halides used as solvents. Other halides of tetravalent titanium, such as titanium tetrabromide, titanium tetraiodide and titanium tetrafluoride, can also be used.

Among the alkyl halides, saturated short-chain alkyl mono- and di-halides, which preferably contain 1 to 4 carbon atoms and chlorine and/or bromine as the halogen atoms, are of special interest. Such halides are for example methyl, ethyl, propyl and butyl chlorides, and also methylene chloride and ethylene chloride and the corresponding bromine compounds. When using ethyl chloride it is advantageous to allow the heat of polymerization to be withdrawn in a simple way by partial evaporation and condensation of this solvent thus taking advantage of its low boiling point (13° C.).

Among the suitable reducing metals, aluminum and zinc are preferred. These metals are preferably used in finely divided form as powder, granules or chips.

In order to activate the metals and titanium halides used in the process, halides of other metals may be added. Such halides are for example aluminum chloride, mercuric chloride or zinc chloride and the corresponding bromides or iodides of these metals.

The molar ratio of the components forming the catalyst mixture can be varied within wide limits. A ratio of about one molecule of titanium halide, about one atom of the reducing metal and about one molecule of the metal salt having activating effect has proved advantageous. It is, however, also possible to work with amounts of the individual components of the catalyst which lie far outside the said ratio. Thus the mol ratio of titanium halide to reducing metal can vary between 1:4 and 4:1. The amount of the metal salt activator can also be increased or reduced so that the mol ratio of reducing metal to metal salt activator can vary between 1:1 and 40:1. The alkyl halide is preferably added in such amounts that at least 3 molecules of alkyl halide are present for 1 atom of reducing metal. Large excesses of the alkyl halide, which probably takes part in the formation of the catalyst complex and also acts as a solvent, are, however, possible. Thus for example 50 to 100 molecules of alkyl halide can be used to 1 atom of the reducing metal. Saturated aliphatic and cycloaliphatic hydrocarbons which are liquid at room temperature and also liquid aromatic or alkyl aromatic hydrocarbons can also be used in conjunction with the alkyl halides as solvents.

The effective catalyst for the polymerization reaction according to this invention is probably a complex compound of still unknown constitution which probably contains the titanium at least partially in trivalent form. The complex is formed by the interaction of the titanium tetrahalide, the reducing metal and the alkyl halide in the presence of an inert gas or of ethylene. These substances react to form the complex catalyst just by mixing them at room temperature or at a lower or higher temperature, e.g. at a temperature between —23° and +80° C.

The catalyst mixture may be prepared for example by adding aluminum granules, and if desired also aluminum chloride, to a solution of titanium tetrachloride in an alkyl halide and stirring this mixture for some time before ethylene is led in. According to another embodiment of the invention a larger amount of the complex catalyst may be prepared in the presence of an inert gas, such as nitrogen.

The required amount of this catalyst suspension which may be diluted with an alkyl halide or a hydrocarbon is then introduced into the reaction vessel. Into this suspension, while stirring, ethylene is then led in, for example at atmospheric pressure. Upon leading in the ethylene, which preferably contains a maximum of 0.01% of oxygen and less than 0.5 grams of water per normal cubic meter, there is precipitated very soon a solid polymer which after some time forms a thick paste with the solvent.

When reaction is ended, the catalyst and solvent can be removed by adding water or dilute hydrochloric acid, distilling off the solvent and separating the polyethylene, which remains in the residue with the aqueous acid catalyst solution, from the aqueous phase and washing it thoroughly with water. After drying, preferably under reduced pressure, the solid polyethylene is preferably treated with boiling hydrocarbons, such as heptane, benzene or toluene, in order to extract from the polyethylene small amounts of waxy components. A polyethylene is then obtained which can be very readily worked up into foils. The polyethylenes produced according to the present invention have as a rule a molecular weight of 20,000 and far more.

The following examples will further illustrate this invention but the invention is not restricted to these examples. The parts are by weight.

*Example 1*

3.8 parts of titanium tetrachloride, 2.6 parts of aluminum chloride and 0.5 part of aluminum granules are suspended in 500 parts of ethyl chloride. This mixture is stirred in an inert atmosphere, as for example in ethyl chloride vapor at the boiling point of the ethyl chloride, until a brown suspension begins to form. Ethylene, which has been purified over potassium vapor, is then led in at atmospheric pressure and at the boiling temperature of the ethyl chloride, and after a short time a brown paste of the solid polymerization product in the ethyl chloride is formed. After separating the solvent, it is thoroughly washed with water and the product thus freed from the bulk of the catalyst, after drying under reduced pressure at 100° C., extracted with boiling benzene. After removal of the benzene, 80 parts of polyethylene are obtained as a white powder which can readily be pressed to thin, strong foils. The molecular weight is a multiple of that of commercial polyethylenes which have been prepared by polymerization according to the high pressure process. 30 parts of a paraffinic wax melting at 110° C. can be recovered from the benzene extract as a by-product.

*Example 2*

The catalyst suspension used is prepared as follows:
10.8 parts of aluminum granules, 0.5 part of aluminum chloride, 180 parts of ethyl chloride and 38 parts of titanium tetrachloride are kept boiling under reflux in a stirring vessel with a reflux condenser at 15° C. and at atmospheric pressure for several hours. The aluminum granules have then disappeared and instead there has been formed a suspension of a brown solid complex compound very difficultly soluble in ethyl chloride. The suspension is diluted with 300 parts of iso-octane, and 50 parts of the same are introduced into an autoclave together with 350 parts of iso-octane.

After expelling the air with ethylene, the autoclave is heated to 80° C. and ethylene forced in at a pressure of 50 atmospheres until the absorption of gas is at a standstill. The brown pasty contents of the autoclave are cooled, the residual ethylene removed by releasing the pressure and then stirred with about the same volume of methanol, a paste of a colorless polyethylene thereby being formed by alcoholysis of the catalyst. After filtration by suction, washing with methanol and drying, 180 parts of a polymer are obtained which exhibits a melting point of 124° to 128° C. measured under the hot microscope in polarized light.

*Example 3*

The catalyst suspension used is obtained in the manner described in Example 2 from 21.6 parts of aluminum granules, 100 parts of ethylene bromide, 400 parts of methylene chloride and 76 parts of titanium tetrachloride by heating for several hours under reflux. The suspension is diluted with 500 parts of iso-octane and 50 parts thereof together with 450 parts of iso-octane are treated with ethylene in an autoclave as described in Example 2. After working up the reaction mixture as described in Example 2, 210 parts of a colorless polyethylene with a melting point of 123° to 124° C. are obtained.

*Example 4*

The catalyst suspension used is prepared in the manner described in Example 2 with the difference that 0.5 part of anhydrous zinc chloride is used instead of the aluminum chloride. The resultant brown catalyst suspension is diluted with 300 parts of iso-octane and 50 parts thereof together with 350 parts of iso-octane are used for the polymerization of ethylene in the manner described in Example 2. After alcoholysis and drying, 160 parts of a colorless film-forming polyethylene are obtained.

We claim:

1. A method of polymerizing ethylene which comprises contacting ethylene with a polymerization catalyst of the preformed product of simultaneous interaction of, in relative proportions, about ¼ to 4 mols of a titanium tetrahalide, about 1 mol of a metal capable of reducing tetravalent titanium to trivalent titanium, at least about 3 mols of an alkyl halide containing 1 to 4 carbon atoms, and about 0.025 to 1 mol of a halide of a metal selected from the group consisting of aluminum, zinc, and mercury.

2. A method of polymerizing ethylene which comprises contacting ethylene with a polymerization catalyst of the preformed product of simultaneous interaction of, in relative proportions, about ¼ to 4 mols of titanium tetrahalide, about 1 mol of aluminum, at least about 3 mols of an alkyl halide containing 1 to 4 carbon atoms, and about 0.025 to 1 mol of a halide of a metal selected from the group consisting of aluminum, zinc, and mercury.

3. A method of polymerizing ethylene which comprises contacting ethylene with a polymerization catalyst of the preformed product of simultaneous interaction of, in relative proportions, about ¼ to 4 mols of titanium tetrachloride, about 1 mol of aluminum, at least about 3 mols of an alkyl halide containing 1 to 4 carbon atoms, and about 0.025 to 1 mol of a halide of a metal selected from the group consisting of aluminum, zinc, and mercury.

4. A method as claimed in claim 3 wherein said alkyl halide is ethyl chloride.

5. A method as claimed in claim 3 wherein said alkyl halide is ethyl bromide.

6. A method as claimed in claim 3 wherein said alkyl halide is ethylene chloride.

7. A method as claimed in claim 3 wherein said alkyl halide is methylene chloride.

8. A method of polymerizing ethylene which comprises contacting ethylene with a polymerization catalyst of the preformed product of simultaneous interaction of, in relative proportions, about ¼ to 4 mols of titanium tetrachloride, about 1 mol of aluminum, at least about 3 mols of an alkyl halide containing 1 to 4 carbon atoms, and about 0.025 to 1 mol of aluminum chloride.

9. A method as claimed in claim 8 wherein said alkyl halide is an alkyl chloride.

10. A method as claimed in claim 8 wherein said alkyl halide is an alkyl bromide.

11. A method as claimed in claim 8 wherein said alkyl halide is ethylene bromide.

12. A method of polymerizing ethylene which comprises contacting ethylene with a polymerization catalyst of the preformed product of simultaneous interaction of, in relative proportions, about ¼ to 4 mols of titanium tetrachloride, about 1 mol of aluminum and at least about 3 mols of an alkyl halide containing 1 to 4 carbon atoms, and about 0.025 to 1 mol of zinc chloride.

13. A method of producing a solid polyethylene polymer which comprises contacting ethylene with a polymerization catalyst consisting essentially of the preformed product of simultaneous interaction of, in relative proportions, about ¼ to 4 mols of titanium tetrachloride, 1 mol of a member selected from the group consisting of aluminum and zinc, at least about 3 mols of a member selected from the group consisting of ethyl chloride, ethyl bromide, ethylene chloride, ethylene bromide, and methylene chloride, and about 0.025 to 1 mol of aluminum chloride.

14. A method of producing a solid polyethylene polymer which comprises contacting ethylene with a polymerization catalyst consisting essentially of the preformed product of simultaneous interaction of, in relative proportions, about ¼ to 4 mols of titanium tetrachloride, 1 mol of a member selected from the group consisting of aluminum and zinc, at least about 3 mols of a member selected from the group consisting of ethyl chloride, ethyl bromide, ethylene choride, ethylene bromide, and methylene chloride, and about 0.025 to 1 mol of zinc chloride.

15. A method of producing a solid polyethylene polymer which comprises contacting ethylene with a polymerization catalyst consisting essentially of the preformed product of simultaneous interaction of, in relative proportions, about ¼ to 4 mols of titanium tetrachloride, 1 mol of a member selected from the group consisting of aluminum and zinc, at least about 3 mols of a member selected from the group consisting of ethyl chloride, ethyl bromide, ethylene chloride, ethylene bromide, and methylene chloride, and about 0.025 to 1 mol of mercuric chloride.

References Cited in the file of this patent

UNITED STATES PATENTS

| | | |
|---|---|---|
| 2,270,292 | Grosse | Jan. 20, 1942 |
| 2,271,956 | Ruthruff | Feb. 3, 1942 |
| 2,440,498 | Young et al. | Apr. 27, 1948 |
| 2,721,189 | Anderson et al. | Oct. 18, 1955 |
| 2,786,035 | Freimiller et al. | Mar. 19, 1957 |
| 2,832,759 | Nowlin et al. | Apr. 29, 1958 |
| 2,886,560 | Weber et al. | May 12, 1959 |

FOREIGN PATENTS

| | | |
|---|---|---|
| 534,792 | Belgium | Jan. 31, 1955 |
| 874,215 | Germany | Apr. 20, 1953 |

OTHER REFERENCES

J.A.C.S., vol. 60, page 2276 (1938).

Jour. Institution of Pet. Tech., vol. 23, pages 679–687 (1937).